US009236589B2

(12) United States Patent
Lee

(10) Patent No.: US 9,236,589 B2
(45) Date of Patent: Jan. 12, 2016

(54) BATTERY MODULE INCLUDING OPENING/CLOSING MEMBER TO CONTROL OPENING STATE OF INLET OF HOUSING

(75) Inventor: Sang-Hoon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 259 days.

(21) Appl. No.: 13/555,925

(22) Filed: Jul. 23, 2012

(65) Prior Publication Data

US 2013/0196199 A1 Aug. 1, 2013

Related U.S. Application Data

(60) Provisional application No. 61/591,170, filed on Jan. 26, 2012.

(51) Int. Cl.
| H01M 2/12 | (2006.01) |
| H01M 10/613 | (2014.01) |
| H01M 10/625 | (2014.01) |
| H01M 10/6566 | (2014.01) |
| H01M 2/10 | (2006.01) |

(52) U.S. Cl.
CPC .......... *H01M 2/1072* (2013.01); *H01M 2/1083* (2013.01); *H01M 2/1094* (2013.01); *H01M 10/613* (2015.04); *H01M 10/625* (2015.04); *H01M 2/1077* (2013.01)

(58) Field of Classification Search
CPC ............ H01M 2/1072; H01M 2/1094; H01M 2/1083; H01M 2/1077; H01M 10/5016; H01M 10/5004
USPC .................................................. 429/83, 120
See application file for complete search history.

(56) References Cited

U.S. PATENT DOCUMENTS

| 3,507,708 | A | * | 4/1970 | Vignaud .......................... 429/86 |
| 5,215,834 | A | | 6/1993 | Reher et al. |
| 5,806,948 | A | | 9/1998 | Rowan, Sr. et al. |
| 2007/0238015 | A1 | * | 10/2007 | Kubota et al. ................. 429/120 |
| 2009/0311586 | A1 | * | 12/2009 | Chung et al. ................... 429/120 |
| 2010/0163326 | A1 | * | 7/2010 | Takamura et al. ........... 180/68.5 |

FOREIGN PATENT DOCUMENTS

| JP | 07-040877 A | | 2/1995 |
| JP | 2001167803 A | * | 6/2001 |
| JP | 2004-194384 A | | 7/2004 |
| JP | 2010-233417 | | 10/2010 |
| WO | WO 00/36696 A1 | | 6/2000 |
| WO | WO 2009140199 A2 | * | 11/2009 |

OTHER PUBLICATIONS

Eto, T., Machine translation of JP 2001-167803 A, Jun. 2001.*
EPO Search Report dated Jun. 13, 2013, for corresponding European Patent application 12180887.7, ( 6 pages).
Patent Abstracts of Japan, and English machine translation of Japanese Publication 2010-233417 dated Oct. 14, 2010, listed above (8 pages).

* cited by examiner

*Primary Examiner* — Sean P Cullen
(74) *Attorney, Agent, or Firm* — Christie, Parker & Hale, LLP

(57) ABSTRACT

A battery module and a vehicle including a battery module. A battery module includes: a housing including an inlet to pass air from an outside of the housing into an interior of the housing; at least one rechargeable battery housed in the interior of the housing; and an opening/closing member configured to control an opening state of the inlet according to a pressure of the air acting against the opening/closing member from the outside of the housing.

13 Claims, 8 Drawing Sheets

BATTERY MODULE INCLUDING OPENING/CLOSING MEMBER TO CONTROL OPENING STATE OF INLET OF HOUSING

CROSS-REFERENCE TO RELATED APPLICATION

This application claims priority to and the benefit of U.S. Provisional Application No. 61/591,170, filed on Jan. 26, 2012 in the United States Patent and Trademark Office, the entire content of which is incorporated herein by reference.

BACKGROUND

1. Field

Aspects of embodiments of the present invention relate to a battery module.

2. Description of the Related Art

A rechargeable battery is a battery that can be recharged and discharged, unlike a primary battery that cannot be recharged. A low-capacity rechargeable battery is commonly used for small portable electronic devices, such as a mobile phone, a notebook computer, and a camcorder, and a large-capacity rechargeable battery may be used as a power supply for driving a motor of an electric vehicle or a hybrid vehicle. Recently, a high-output rechargeable battery using a non-aqueous electrolyte solution of high energy density has been developed. The high-output rechargeable battery is configured as a large-capacity battery module in which a plurality of rechargeable batteries are connected to each other in series so as to be used to drive a motor of a device requiring a large amount of power, such as an electric vehicle, a hybrid vehicle, or the like. The battery module is made up of several to tens of rechargeable batteries. Therefore, heat generated from each of the rechargeable batteries should be able to be easily emitted. When heat is not emitted, the internal temperature of the rechargeable battery increases, and, as a result, adverse reactions occur, thereby shortening the life span of the rechargeable battery. Further, when the temperature of the rechargeable battery is continuously increased, the rechargeable battery may combust or explode. The battery module includes a plurality of rechargeable batteries and a housing for receiving the rechargeable batteries and forming a shape, and a fan for cooling the rechargeable batteries is installed in the housing. However, when a cooling fan is installed, the volume of the battery module is increased, and power for driving the fan is consumed to deteriorate output of the battery module. The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a battery module has improved cooling efficiency.

According to an exemplary embodiment of the present invention, a battery module includes: a housing including an inlet to pass air from an outside of the housing into an interior of the housing; at least one rechargeable battery housed in the interior of the housing; and an opening/closing member configured to control an opening state of the inlet according to a pressure of the air acting against the opening/closing member from the outside of the housing.

The opening/closing member may be movable relative to the inlet between a blocking position in which the opening/closing member closes the inlet and an open position in which the inlet is open.

The opening/closing member may include a blocking plate rotatably coupled to the housing via a shaft portion and configured to cover the inlet.

The battery module may further include a spring configured to force the opening/closing member toward the blocking position.

In one embodiment, the housing includes a protrusion adjacent the inlet, when in the blocking position, the opening/closing member abuts the protrusion to seal the inlet, and the protrusion maintains the opening/closing member at an inner side of the inlet that is opposite the outside of the housing.

The housing may further include an outlet to discharge the air from the interior of the housing to the outside of the housing. The inlet may be an opening formed in a first wall of the housing, and the outlet may be an opening formed in a second wall of the housing opposite the first wall. The inlet may be formed at an upper portion of the first wall, and the outlet may be formed at a lower portion of the second wall.

The battery module may further include a film covering the outlet, and the film may be configured to allow the air to pass therethrough from the interior of the housing to the outside of the housing and to block liquids from passing therethrough from the outside of the housing to the interior of the housing. The film may include a material selected from the group consisting of polytetrafluoroethylene (PTFE), a perfluoroalkoxy polymer (PFA), fluorinated ethylene propylene (FEP), an ethylene chlorotrifluoroethylene (ECTFE) copolymer, ethylene tetrafluoroethylene (ETFE), or polyvinylidene fluoride (PVDF).

The battery module may further include a film covering the inlet, and the film may be configured to allow the air to pass therethrough from the outside of the housing to the interior of the housing and to block liquids from passing therethrough from the outside of the housing to the interior of the housing.

In one embodiment, the housing includes a first guide member extending outward from the housing adjacent an upper side of the inlet, and a second guide member extending outward from the housing adjacent a lower side of the inlet, and the first guide member is spaced apart from the second guide member to pass the air therebetween toward the inlet.

The first guide member may include a front portion extending downward in a curved arc shape and a pair of substantially planar side portions at opposite sides of the front portion.

The second guide member may include a first portion proximate the inlet and having a first arc shape that is convex toward the first guide member, and a second portion distal from the inlet and having a second arc shape that is convex away from the first guide member.

The housing may include an inflow pipe, and the inlet may be an opening at an outer end of the inflow pipe. The inflow pipe may have an opening formed through a lower wall thereof.

According to another exemplary embodiment of the present invention, a vehicle includes a battery module, the battery module including: a housing including an inlet to pass air from an outside of the housing into an interior of the housing; at least one rechargeable battery housed in the interior of the housing; and an opening/closing member configured to control an opening state of the inlet according to a pressure of the air acting against the opening/closing member from the outside of the housing, and the inlet faces a first direction, and the pressure is applied to the opening/closing member by the air when the vehicle is moved in the first direction.

In one embodiment, the housing further includes an outlet to discharge the air from the interior of the housing to the outside of the housing, and the battery module further includes a film covering the outlet, the film configured to allow the air to pass therethrough from the interior of the housing to the outside of the housing and to block liquids from passing therethrough from the outside of the housing to the interior of the housing.

In one embodiment, the housing includes a first guide member extending outward from the housing adjacent an upper side of the inlet, and a second guide member extending outward from the housing adjacent a lower side of the inlet, and the first guide member is spaced apart from the second guide member to pass the air therebetween toward the inlet.

The housing may include an inflow pipe, and the inlet may be an opening at an outer end of the inflow pipe.

According to another exemplary embodiment of the present invention, a battery module includes: a plurality of rechargeable batteries; a housing installing the rechargeable batteries and including an inlet; and an opening/closing member for controlling opening of the inlet according to wind pressure. The opening/closing member may be rotatably installed on the housing, and the opening/closing member may include a shaft member, and a blocking plate combined with the shaft member. An elastic member for applying torque may be installed on the opening/closing member.

According to an aspect of embodiments of the present invention, the opening/closing member is opened by wind pressure such that the battery module can efficiently cool the rechargeable batteries without an additional air blower.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
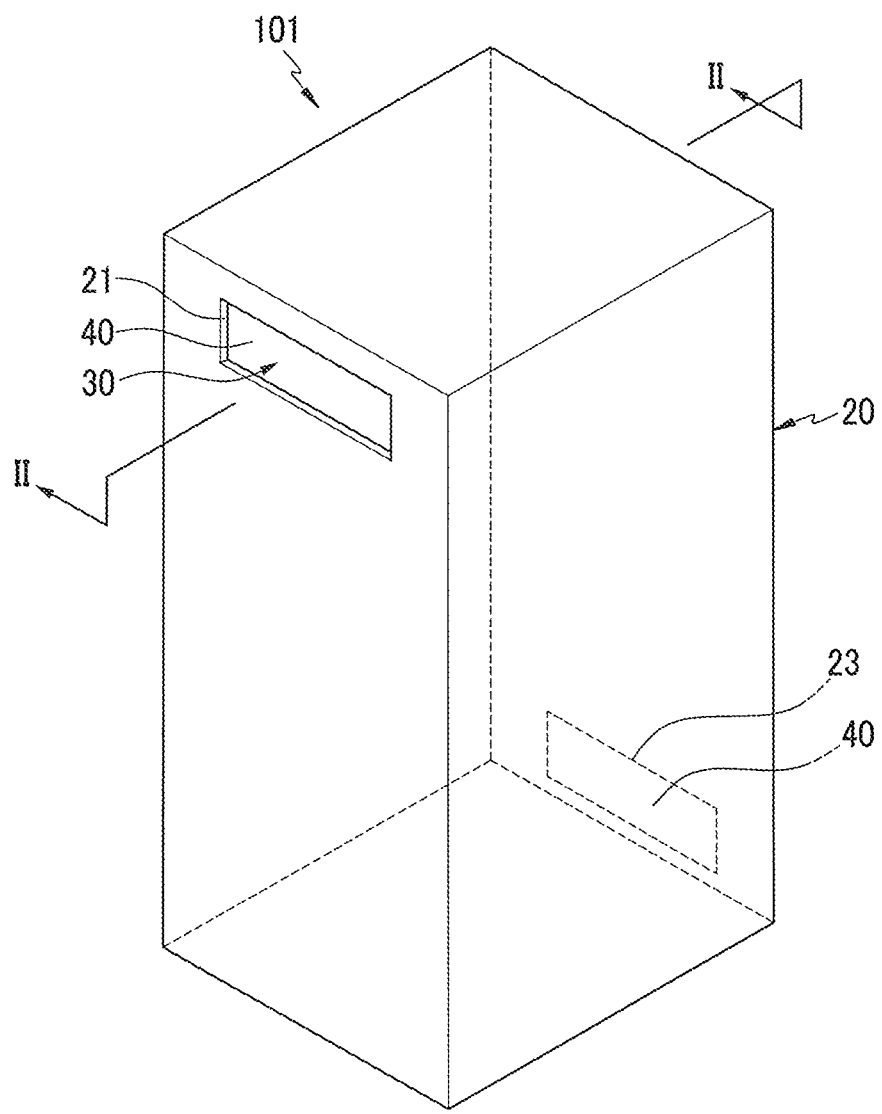
FIG. 1 is a perspective view of a battery module according to an exemplary embodiment of the present invention.

The present invention will be described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
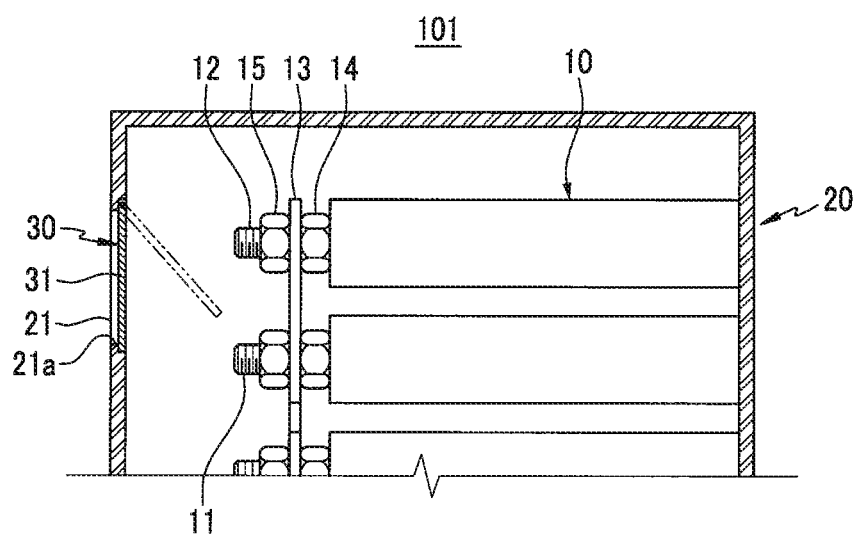
FIG. 2 is a partial cross-sectional view of the battery module of FIG. 1, taken along the line II-II.

FIG. 1 is a perspective view of a battery module according to a first exemplary embodiment of the present invention, and FIG. 2 is a partial cross-sectional view of the battery module of FIG. 1, taken along the line II-II of FIG. 1.

Referring to FIG. 1 and FIG. 2, a battery module 101 according to an embodiment of the present invention includes one or more rechargeable batteries 10 and a housing 20 in which the rechargeable batteries 10 are installed.

The rechargeable batteries 10 are installed in the housing 20, and the rechargeable batteries 10 according to one embodiment may be square or rectangular lithium ion rechargeable batteries. However, the present invention is not limited thereto, but, rather, is applicable to various types of batteries such as lithium polymer batteries or cylindrical batteries.

The rechargeable battery 10 according to one embodiment includes a positive terminal 11, a negative terminal 12, and nuts 14 and 15 fastened to the positive terminal 11 and the negative terminal 12 and supporting a connecting member 13. The rechargeable batteries 10 are coupled (e.g., in series) by the connecting member 13 and are installed in the housing 20.

The housing 20, in one embodiment, is formed to have an approximately rectangular parallelepiped shape, and has an inlet 21 through which air is input and an outlet 23 through which air is output. The inlet 21 is formed at or near a front upper region (e.g., on a front wall) of the housing 20, and the outlet 23 is formed at or near a rear lower region (e.g., on a rear wall) of the housing 20.

An opening/closing member 30 for controlling an opening state of the inlet 21 is installed to be rotatable in the inlet 21 with respect to the inlet 21.

Figure 3:
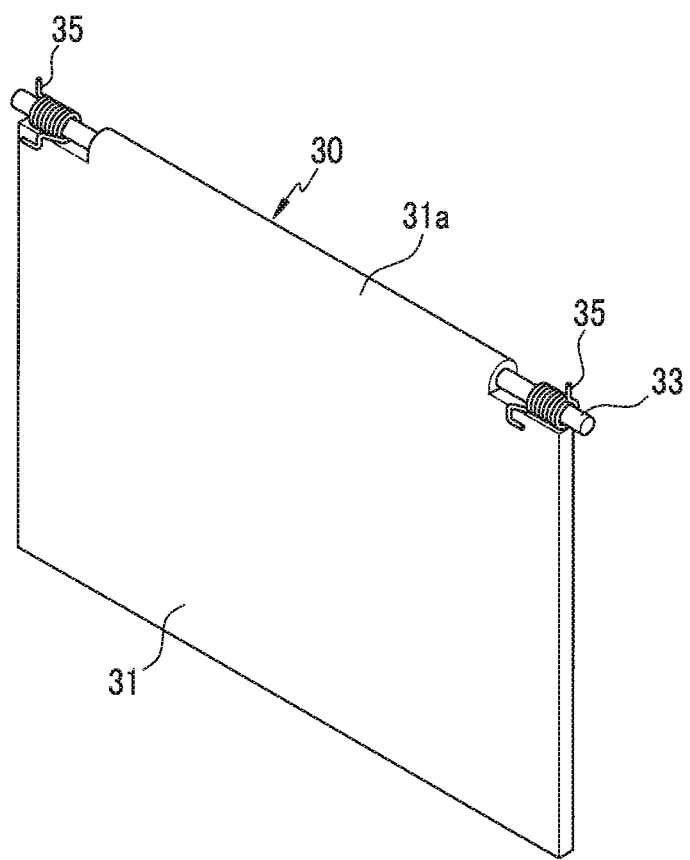
FIG. 3 is a perspective view of an opening/closing member of the battery module of FIG. 1, according to an exemplary embodiment of the present invention.

As shown in FIG. 2 and FIG. 3, in one embodiment, the opening/closing member 30 includes a shaft member 33 and a blocking plate 31 combined with the shaft member 33. The shaft member 33 may be formed to have a circular bar shape, and is fixedly installed in the housing 20 through a top part 31a of the blocking plate 31. In one embodiment, a hole in which the shaft member 33 is inserted is formed in the top part 31a of the blocking plate 31 in a lengthwise direction of the blocking plate 31.

The blocking plate 31 may be formed to have a square shape and may be rotatably combined with the shaft member 33. The blocking plate 31 is formed to block the inlet 21, and, in one embodiment, a torsion spring 35 for applying a rotatable pressing force to the blocking plate 31 is formed on the shaft member 33. In one embodiment, a torsion spring 35 is arranged on both ends of the shaft member 33 and pressurizes a bottom of the blocking plate 31 to face an external side of the housing 20. Accordingly, the blocking plate 31 can be installed to close and seal the inlet 21 by the torsion spring 35.

A protrusion 21a that is protruded and contacts and supports the bottom of the blocking plate 31 is formed at the inlet 21. The protrusion 21a is formed in a widthwise direction of the inlet 21. The protrusion 21a prevents or substantially prevents the bottom of the blocking plate from moving outside the inlet 21.

Figure 8:
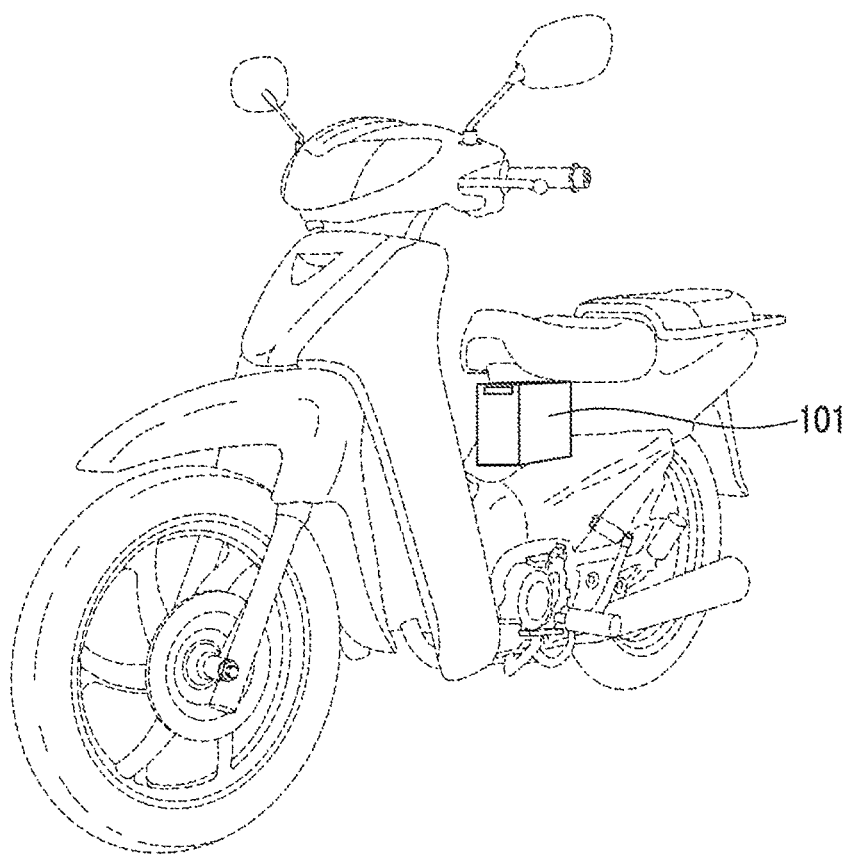
FIG. 8 is a schematic perspective view of a vehicle including a battery module according to an exemplary embodiment of the present invention.

The inlet 21 is exposed on an external side of a device (e.g., a vehicle) in which the battery module 101 is installed, as illustrated in FIG. 8. In one embodiment, the battery module 101 is installed in an electric motorcycle or an electric bicycle, and the batter module 101 may be installed at it left bottom side of the divers seat such that the inlet 21 is exposed to outside. Also, when the battery module 101 is installed in a cell electric vehicle, a pipe for receiving external air may be installed to be connected inlet 21.

Further, the inlet 21 is installed for the device (e.g., a vehicle) in which the battery module 101 is installed to face the progressing direction. When the device moves, the wind pressure influences, or acts on, the blocking plate 31, and the blocking plate 31 is rotated to open the inlet 21, and cooling air is input into the housing 20 through the inlet 21.

The outlet 23, in one embodiment, is formed at the rear lower region of the housing 20, and an air-permeable film 40 is installed in the outlet 23. The air-permeable film 40 may be made of a Teflon-based resin and particularly may be made of polytetrafluoroethylene (PTFE). In one embodiment, the air-permeable film may be made of a perfluoroalkoxy polymer (PFA), fluorinated ethylene propylene (FEP), an ethylene chlorotrifluoroethylene (ECTFE) copolymer, ethylene tetrafluoroethylene (ETFE), or polyvinylidene fluoride (PVDF).

Pores that are larger than the diameter of gas molecules and are smaller than the diameter of water particles are formed in the air-permeable film 40. Accordingly, the gas molecules can pass through the air-permeable film 40 and the water particles cannot pass therethrough such that the gas inside the housing 20 can be discharged to the outside and liquids are prevented or substantially prevented from entering into the housing 20 from the outside.

In one embodiment, the above-described air-permeable film 40 may be installed in the inlet 21, and when it is installed in the inlet 21, rainwater is prevented or substantially prevented from entering the inlet 21.

Figure 4:
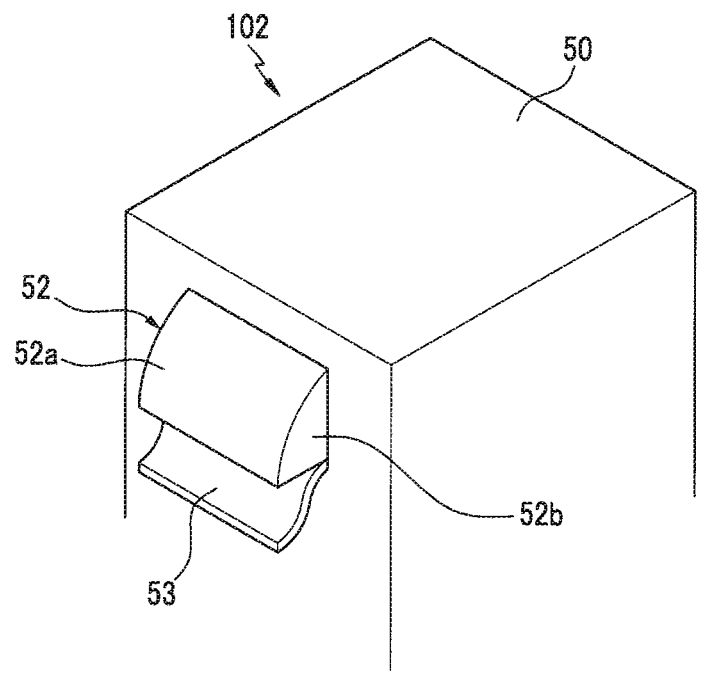
FIG. 4 is a partial perspective view of a battery module according to another exemplary embodiment of the present invention.
Figure 5:
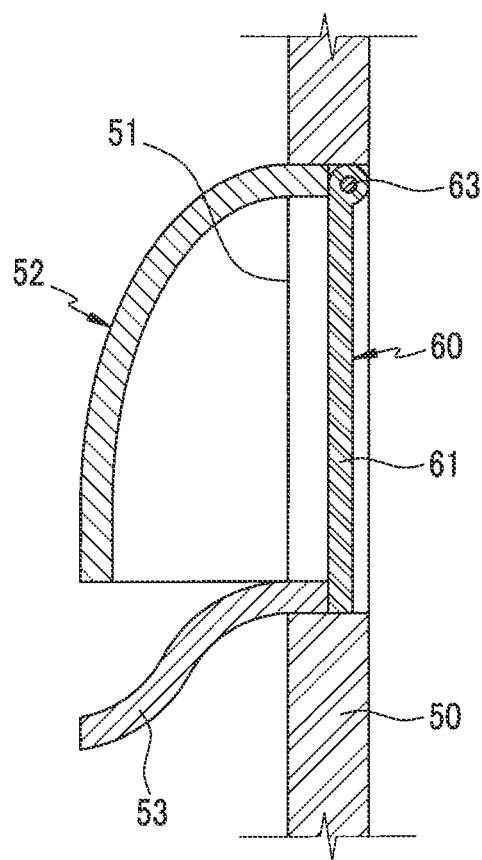
FIG. 5 is a partial cross-sectional view of the battery module of FIG. 4.

FIG. 4 is a partial perspective view of a battery module according to another exemplary embodiment of the present invention, and FIG. 5 is a partial cross-sectional view of the battery module of FIG. 4.

Referring to FIG. 4 and FIG. 5, a battery module 102 according to another embodiment of the present invention includes a housing 50 and one or more rechargeable batteries installed in the housing 50.

An inlet 51 and an outlet are formed in the housing 50, and, in one embodiment, the inlet 51 is formed at or near a front upper region (e.g., on a front wall) of the housing 50, and the outlet is formed at a rear lower region (e.g., on a rear wall) of the housing 50.

An opening/closing member 60 for controlling an opening state of the inlet 51 by wind pressure is installed at the inlet 51, and, in one embodiment, the opening/closing member 60 includes a shaft member 63 and a blocking plate 61 combined with the shaft member 63. In one embodiment, the blocking plate 61 is pressurized toward the inlet 51 by a torsion spring to close the inlet 51.

The battery module 102, in one embodiment, may have an equivalent or similar structure as that of the battery module 101 described above except that guide members are installed at the inlet 51. Therefore, further description of the same features and structures will not be provided.

In one embodiment, a top guide member 52 is installed at the top of the inlet 51, and a bottom guide member 53 is installed at the bottom of the inlet 51. The top guide member 52 includes a front unit 52a that is protruded to the outside on the top of the inlet 51 and that is extended to the bottom to a front end, and a side unit 52b connecting a side end of the front unit 52a and an external wall of the housing 50.

The front unit 52a, in one embodiment, is formed to have a curved arc plate shape, and is protruded to the front side on the inlet 51 to reach the top of the inlet 51. The side unit 52b may include a pair of side units 52b formed to have a planar plate shape and blocking portions between the side ends of the front unit 52a and the housing 50.

When the top guide member 52 is installed according to the present exemplary embodiment, moisture is prevented or substantially prevented from entering into the housing 50 from the outside through the inlet 51.

The bottom guide member 53, in one embodiment, is formed to have a plate shape that is protruded to the front side at the bottom of the inlet 51, and the bottom guide member 53 may be formed to have an arc shape that is smoothly curved downward from the inlet 51 and a front end protruded toward the front side.

The bottom guide member 53 is spaced apart from the top guide member 52 such that a space is formed between the top guide member 52 and the bottom guide member 53. The bottom guide member 53 controls or guides air to be input into the housing 50, and the air guided by the bottom guide member 53 is input into the inlet 51 to cool the rechargeable batteries and is then discharged to the outside through the outlet.

According to the above-described exemplary embodiment of the present invention, the top guide member 52 is installed to block inflow of moisture (e.g., rain) into the housing 50, and the bottom guide member 53 guides the air to be supplied into the housing 50.

Figure 6:
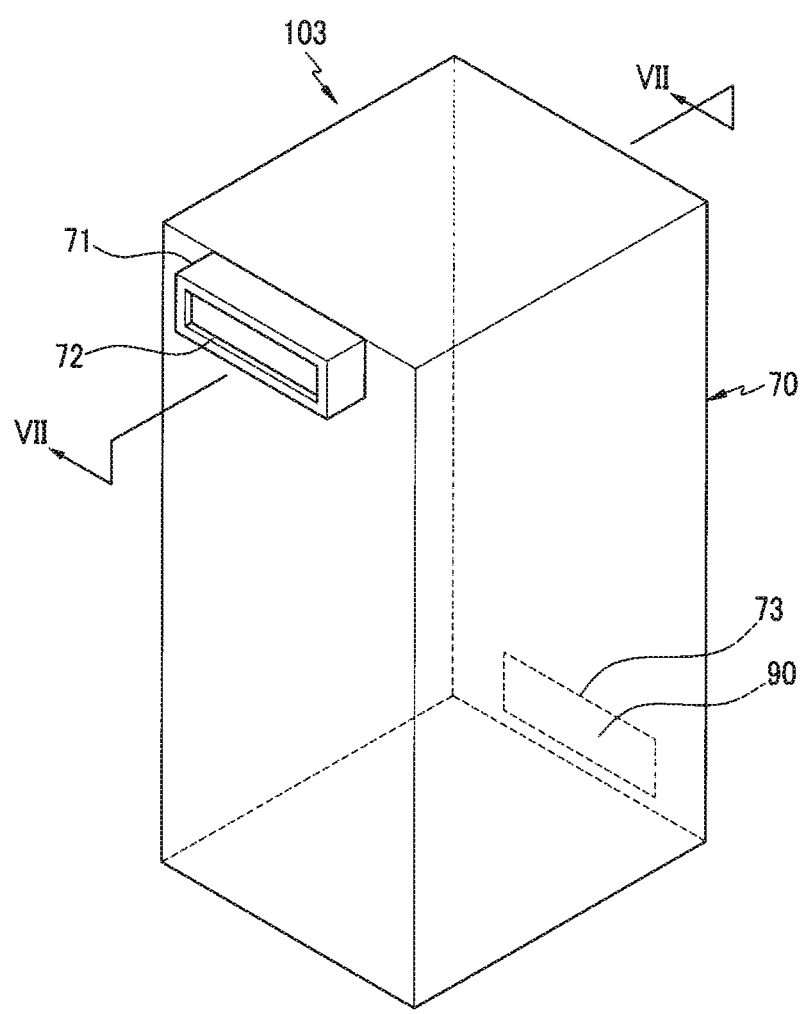
FIG. 6 is a perspective view of a battery module according to another exemplary embodiment of the present invention.
Figure 7:
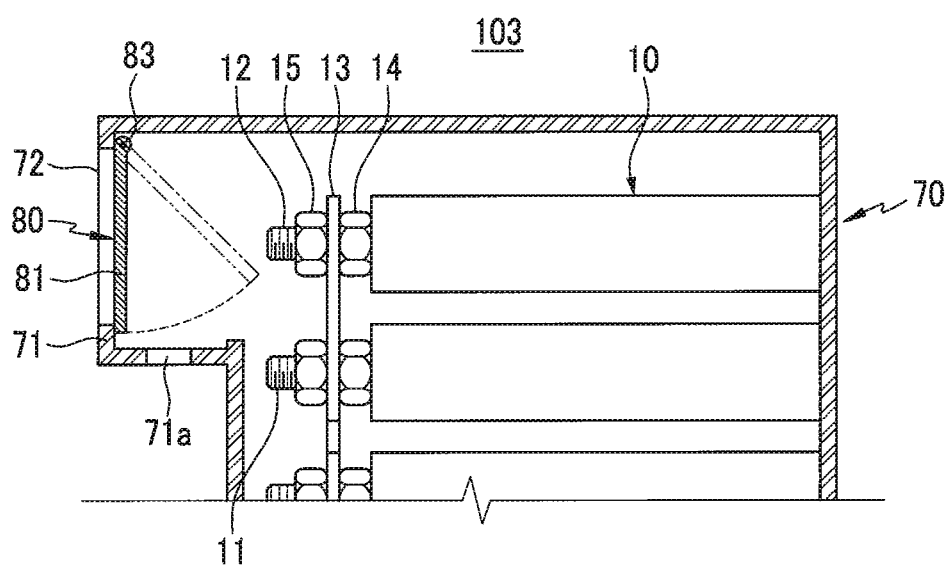
FIG. 7 is a partial cross-sectional view of the battery module of FIG. 6, taken along the line VII-VII.

FIG. 6 is a perspective view of a battery module according to another exemplary embodiment of the present invention, and FIG. 7 is a partial cross-sectional view of the battery module of FIG. 6, taken along the line VII-VII of FIG. 6.

Referring to FIG. 6 and FIG. 7, a battery module 103 according to another embodiment of the present invention includes a housing 70 and one or more rechargeable batteries 10 installed in the housing 70.

The housing 70, in one embodiment, may be formed to have a generally cuboidal box shape having an inner space. An inlet 72 and an outlet 73 are formed in the housing 70, and, in one embodiment, the inlet 72 is formed at or near a front upper region (e.g., on a front wall) of the housing 70 and the outlet 73 is formed at or near a rear lower region (e.g., on a rear wall) of the housing 70.

An opening/closing member 80 for controlling an opening state of the inlet 72 by wind pressure is installed at the inlet 72, and the opening/closing member 80, in one embodiment, includes a shaft member 83 and a blocking plate 81 combined with the shaft member 83. In one embodiment, the blocking plate 81 is pressurized by a torsion spring to close the inlet 72.

An inflow pipe 71 that is protruded to the front side is formed at the front upper region of the housing 70, and the inlet 72 is formed at the front end of the inflow pipe 71. The opening/closing member 80 is installed to open and close the inlet 72 in the inflow pipe 71.

The battery module 103, in one embodiment, may have an equivalent or similar structure as that of the battery module 101 described above except for a structure of the housing 70. Therefore, further description of the same features and structures will not be provided.

The inflow pipe 71, in one embodiment, is configured as a quadrangular pipe and is protruded to the front side of the housing 70 at the front upper region of the housing 70, thereby being connected to the inside of the housing 70. According to one exemplary embodiment, the inflow pipe 71 has a quadrangular cross-section, but the present invention is not limited thereto, and, in other embodiments, the inflow pipe 71 can have various structures and configurations, such as a circular pipe.

The inlet 72 is formed at the front end of the inflow pipe 71, and the opening/closing member 80 is installed at the back of the inlet 72. The opening/closing member 80, in one embodiment, is installed in the inlet 72 in a rotatable manner to open the inlet 72 depending on the wind pressure.

The opening/closing member 80, in one embodiment, includes the shaft member 83 and the blocking plate 81 combined with the shaft member 83. In one embodiment, the blocking plate 81 is pressurized into the inlet 72 by a torsion spring to close the inlet 72. Therefore, the inlet 72 can be opened when wind pressure that is greater than the pressing force of the torsion spring acts on the blocking plate 81.

The inflow pipe 71, in one embodiment, is installed to be exposed to the outside or to be connected to a pipe for receiving external air.

In one embodiment, a hole 71a is formed at the bottom of the inflow pipe 71, and the hole 71a functions as a passage for discharging moisture (e.g., rainwater) that enters into the inflow pipe 71.

The outlet 73 may be formed at the rear lower region of the housing 70, and, in one embodiment, an air-permeable film 90 is installed in the outlet 73. The air-permeable film 90 may be made of a Teflon-based resin, and particularly may be made of polytetrafluoroethylene (PTFE). In one embodiment, the air-permeable film 90 may be made of a perfluoroalkoxy polymer (PFA), fluorinated ethylene propylene (FEP), an ethylene chlorotrifluoroethylene (ECTFE) copolymer, ethylene tetrafluoroethylene (ETFE), or polyvinylidene fluoride (PVDF).

Pores that are larger than the diameter of gas molecules and are smaller than the diameter of water particles are formed in the air-permeable film 90. Accordingly, the gas molecules can pass through the air-permeable film 90, and the water particles cannot pass through the air-permeable film 90, such that the gas inside the housing 70 can be discharged to the outside and liquids are prevented or substantially prevented from entering into the housing 70 from the outside. In one embodiment, the air-permeable film 90 may be installed in the inlet 72.

When the inflow pipe 71 is formed according to the present exemplary embodiment, the opening/closing member 80 is driven in the inflow pipe 71 to prevent or substantially prevent interference with the rechargeable batteries 10, and moisture (e.g., rainwater) that enters through the inflow pipe 71 can be easily discharged through the hole 71a.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
    a housing including an inlet to pass air from an outside of the housing into an interior of the housing, and an outlet to discharge the air from the interior of the housing to the outside of the housing;
    at least one rechargeable battery housed in the interior of the housing; and
    an opening/closing member configured to control an opening state of the inlet according to a pressure of the air acting against the opening/closing member from the outside of the housing,
    wherein the inlet is at an upper portion of the housing facing a first direction, and the outlet is at a lower portion of the housing relative to the inlet,
    wherein the housing comprises a first guide member extending outward from the housing in the first direction adjacent an upper side of the inlet, and a second guide member extending outward from the housing in the first direction adjacent a lower side of the inlet,
    wherein the first guide member is spaced apart from the second guide member to pass the air therebetween toward the inlet, and
    wherein the first guide member comprises a front portion extending outward from the housing in the first direction and in a curved arc shape to a front end of the first guide member, and the second guide member extends outward from the housing to a front end of the second guide member that is spaced apart from the front end of the first guide member to define a space therebetween that is open toward the first direction to pass the air toward the inlet, the second guide member having aplate shape including a first portion proximate the inlet and a second portion distal from the inlet that is convex away from the front end of the first guide member.

2. The battery module of claim 1, wherein the inlet is an opening formed in a first wall of the housing, and the outlet is an opening formed in a second wall of the housing opposite the first wall.

3. The battery module of claim 1, wherein the first guide member further comprises a pair of substantially planar side portions at opposite sides of the front portion.

4. The battery module of claim 1, wherein the first portion of the second guide member proximate the inlet has a first arc shape that is convex toward the first guide member.

5. The battery module of claim 1, further comprising a film covering the inlet, wherein the film is configured to allow the air to pass therethrough from the outside of the housing to the interior of the housing and to block liquids from passing therethrough from the outside of the housing to the interior of the housing.

6. The battery module of claim 1, further comprising a film covering the outlet, Wherein the film is configured to allow the air to pass therethrough from the interior of the housing to the outside of the housing and to block liquids from passing therethrough from the outside of the housing to the interior of the housing.

7. The battery module of claim 6, wherein the film comprises a material selected from the group consisting of polytetrafluoroethylene (PTFE), a perfluoroalkoxy polymer (PFA), fluorinated ethylene propylene (FEP), an ethylene chlorotrifluoroethylene (ECTFE) copolymer, ethylene tetrafluoroethylene (FIFE), or polyvinylidene fluoride (PVDF).

8. The battery module of claim 1, wherein the opening/closing member is movable relative to the inlet between a blocking position in which the opening/closing member closes the inlet and an open position in which the inlet is open.

9. The battery module of claim 8, wherein the opening/closing member comprises a blocking plate rotatably coupled to the housing via a shaft portion and configured to cover the inlet.

10. The battery module of claim 8, further comprising a spring configured to force the opening/closing member toward the blocking position.

11. The battery module of claim 8,
    wherein the housing comprises a protrusion adjacent the inlet,
    wherein, when in the blocking position, the opening/closing member abuts the protrusion to seal the inlet, and
    wherein the protrusion maintains the opening/closing member at an inner side of the inlet that is opposite the outside of the housing.

12. A vehicle comprising a battery module, the battery module comprising:
- a housing including an inlet to pass air from an outside of the vehicle into an interior of the housing;
- at least one rechargeable battery housed in the interior of the housing; and
- an opening/closing member configured to control an opening state of the inlet according to a pressure of the air acting against the opening/closing member from the outside of the vehicle,
- wherein the inlet faces a first direction and is exposed to the outside of the vehicle, and the pressure is applied to the opening/closing member by the air when the vehicle is moved in the first direction,
- wherein the housing comprises a first guide member extending outward from the housing in the first direction adjacent an upper side of the inlet, and a second guide member extending outward from the housing in the first direction adjacent a lower side of the inlet,
- wherein the first guide member is spaced apart from the second guide member to pass the air therebetween toward the inlet, and
- wherein the first guide member comprises a front portion extending outward from the housing in the first direction and downward in a curved arc shape.

13. The vehicle of claim 12,
- wherein the housing further includes an outlet to discharge the air from the interior of the housing to an outside of the housing, and
- wherein the battery module further comprises a film covering the outlet, the film configured to allow the air to pass therethrough from the interior of the housing to the outside of the housing and to block liquids from passing therethrough from the outside of the housing to the interior of the housing.

* * * * *